United States Patent [19]
Chen et al.

[11] Patent Number: 5,951,698
[45] Date of Patent: Sep. 14, 1999

[54] SYSTEM, APPARATUS AND METHOD FOR THE DETECTION AND REMOVAL OF VIRUSES IN MACROS

[75] Inventors: Eva Y. Chen, Cupertino, Calif.; Jonny T. Ro, Taipei, Taiwan; Ming M. Deng, Taipei, Taiwan; Leta M. Chi, Taipei, Taiwan

[73] Assignee: Trend Micro, Incorporated, Cupertino, Calif.

[21] Appl. No.: 08/724,949

[22] Filed: Oct. 2, 1996

[51] Int. Cl.⁶ ................................................. G06F 11/00
[52] U.S. Cl. ............................................................. 714/38
[58] Field of Search ................ 395/183.14, 183.15, 395/183.13, 183.08, 183.09, 704, 186, 188.01, 187.01; 380/3, 4

[56] References Cited

U.S. PATENT DOCUMENTS

| | | | |
|---|---|---|---|
| 4,975,950 | 12/1990 | Lentz | 390/4 |
| 5,278,901 | 1/1994 | Shieh et al. | 380/4 |
| 5,319,776 | 6/1994 | Hile et al. | 395/575 |
| 5,321,840 | 6/1994 | Ahlin et al. | 395/700 |
| 5,408,642 | 4/1995 | Mann | 395/183.14 |
| 5,414,833 | 5/1995 | Hershey et al. | 395/575 |
| 5,440,723 | 8/1995 | Arnold et al. | 395/183.14 |
| 5,444,850 | 8/1995 | Chang | 395/200.1 |
| 5,448,668 | 9/1995 | Perelson et al. | 395/182.19 |
| 5,452,442 | 9/1995 | Kephart | 395/183.14 |
| 5,485,575 | 1/1996 | Chess et al. | 395/183.14 |
| 5,491,791 | 2/1996 | Glowny et al. | 395/183.13 |
| 5,511,163 | 4/1996 | Lerche et al. | 398/183.04 |
| 5,530,757 | 6/1996 | Krawczyk | 380/23 |
| 5,550,976 | 8/1996 | Henderson et al. | 395/200.06 |
| 5,550,984 | 8/1996 | Gelb | 395/200.17 |
| 5,649,095 | 7/1997 | Cozza | 395/183.15 |

FOREIGN PATENT DOCUMENTS

| | | | |
|---|---|---|---|
| 666671 | 8/1995 | European Pat. Off. | H04L 29/06 |
| 6350784 | 6/1994 | Japan | H04N 1/00 |
| 9322723 | 11/1993 | WIPO | G06F 11/00 |

OTHER PUBLICATIONS

Malarky, Anti Virus comaprative Review, Virus Bulletin, pp. 10–11, May 1996.

Meyer, "Possible Macro Virus Attacks and How to Prevent Them", Computers & Security, vol. 15, No. 7, pp. 595–625, 1996.

*Primary Examiner*—Joseph E. Palys
*Attorney, Agent, or Firm*—Skjerven, Morrill, MacPherson, Franklin & Friel LLP; Norman R. Klivans

[57] ABSTRACT

The detection and removal of viruses from macros is disclosed. A macro virus detection module includes a macro locating and decoding module, a macro virus scanning module, a macro treating module, a file treating module, and a virus information module. The macro locating and decoding module determines whether a targeted file includes a macro, and, where a macro is found, locates and decodes it to produce a decoded macro. The macro virus scanning module accesses the decoded macro and scans it to determine whether it includes any viruses. Unknown macro viruses are detected by the macro virus scanning module by obtaining comparison data that includes sets of instruction identifiers from the virus information module and determining whether the decoded macro includes a combination of suspect instructions which correspond to instruction identifiers. The macro treating module locates suspect instructions in the decoded macro using the comparison data and removes the suspect instructions to produce a treated macro. The file correcting module accesses a targeted file with an infected macro and replaces the infected macro with the treated macro produced by the macro treating module.

25 Claims, 7 Drawing Sheets

| SET # | INSTRUCTION ID# | INSTRUCTION IDENTIFIER (TEXT/HEX) |
|---|---|---|
| 1 | 1 | .Format = 1<br>73 CB 00 0C 6C 01 00 |
| | 2 | Macro Copy<br>67 C2 80 |
| 2 | 1 | .Format = 1<br>73 CB 00 0C 6C 01 00 |
| | 2 | Organizer .Copy<br>64 6F 02 67 DE 00 73 87 02 12 73 7F |
| 3 | 1 | .Format = 1<br>73 CB 00 0C 6C 01 00 |
| | 2 | macros.<br>6D 61 63 72 6F 73 76 08 |
| 4 | 1 | FileSaveAs a$,1<br>12 6C 01 00 |
| | 2 | MacroCopy<br>64 67 C2 80 6A 0F 47 |
| 5 | 1 | ylformat c: /u"<br>79 7C 66 6F 72 6D 61 74 20 63 6A |
| | 2 | Environ$ ("COMSPEC")<br>80 05 6A 07 043 4F 4D |
| ... | ... | ... |
| i | 1 | ... |
| | 2 | ... |
| | ... | ... |
| | j | ... |

FIG. 9

SYSTEM, APPARATUS AND METHOD FOR THE DETECTION AND REMOVAL OF VIRUSES IN MACROS

BACKGROUND OF THE INVENTION

1. Field of the Invention

The present invention relates generally to the detection of viruses in computer files and more particularly to the detection and removal of viruses in macros.

2. Description of the Related Art

The increasing use of computers and the increasing communication between vast numbers of computers has greatly facilitated and promoted the spread of computer viruses. Computer viruses are found in portions of code which are buried within computer programs. When programs that are infected with the virus are executed, the code portions are activated to provide unintended and sometimes damaging operations in the computer system.

Viruses are commonly detected using signature scanning techniques. Known viruses have extended strings or signatures which are like a fingerprint that can be used to detect the virus. In signature scanning an executable file sequence is scanned to see if it includes an extended string that matches a string that is known to be a virus. When the signature or string is found within the executable file, a positive virus determination is made. Since matching to known patterns is involved, the signature scan is virtually useless against viruses whose patterns have not been previously identified. Particularly, signature scanning completely fails to detect new, unknown virus strains, and does not adequately protect against mutating viruses, which intentionally assume various shapes and forms upon replication. Additionally, since executable files (e.g., those with extensions .exe or .com) are typically scanned, viruses which do not reside in such files are not examined and therefore are not detected with signature scanning.

Many application programs support the use of macros which are used to automatically perform long or repetitive sequences of actions. Macros are a series of instructions including menu selections, keystrokes and/or commands that are recorded and assigned a name or a key. Macros can be triggered by the application program such as by pressing the key or calling the macro name. Some macros are embedded within application data files, and thus may remain hidden from the user. Additionally, macros can be arranged to execute automatically, without user input. Thus, a macro which the user does not know about and which does not need manual triggering by the user may reside in files such as application data files. Certain viruses reside in macros and use macro instructions to perform unintended and sometimes damaging actions. These viruses are referred to as macro viruses. One problem with macro viruses is that they avoid executable file scanners since they typically do not reside in executable files. Additionally, macro viruses avoid detection since they can be hidden or embedded within files such as application data files. Furthermore, there are a tremendous number of computer users who know how to use macro programming languages so the number and variation of macro viruses is extremely high. Accordingly, even if signature scanning techniques were used to detect viruses in macros they would be ineffective since there are numerous unknown macro viruses. Additionally, even if a comprehensive signature scanner were available, it would quickly become obsolete because of the ongoing generation and production of new, unknown macro viruses.

Conventional virus treatment techniques are also inadequate for treating macros with viruses. These techniques look for particular, known viruses and apply a specific correction technique dependent upon the particular virus detected. Because of the vast array of unknown macro viruses, such techniques are not very effective in the treatment of macros which are infected by viruses. Even if unknown macros were detected, merely deleting the file with the infected macro is not an attractive solution, since infected macros often include legitimate operations that the user may want to retain. Thus, there is a need to selectively remove viruses, particularly unknown viruses, from macros to provide a clean, corrected file which can be subsequently used.

Another problem is that viruses, and therefore, the information that is needed to detect them, are in a constant state of change. Thus, a virus detection method and apparatus which facilitates easy updates of virus detection information is needed. Particularly required is easily modified unknown macro virus detection information.

Thus, there is a need for the detection of viruses which reside in macros. Moreover, there is a need for detecting unknown macro viruses, for cleaning macro viruses selectively, and for conveniently updating macro virus detection information.

BRIEF SUMMARY OF THE INVENTION

The present invention overcomes the limitations and shortcomings of the prior art with systems, apparatuses and methods for detecting and removing viruses from macros.

In accordance with the present invention, a macro virus detection module includes a macro locating and decoding module, a macro virus scanning module, a macro treating module, a virus information module, a file correcting module, and a data buffer. A file is targeted for virus detection according to the configuration settings of the macro virus detection module and is copied into the data buffer for analysis. The macro locating and decoding module examines the file to determine whether it is a template file. If it is determined that the file is a template file, any macros within the template file are located and decoded. If the target file is not a template file, then the macro locating and decoding module examines the target file to determine whether it includes any embedded macros that are then located and decoded. The decoded macros are stored in the data buffer.

The macro scanning module is in communication with the macro locating and decoding module and the data buffer and thus accesses the decoded macros for virus scanning. The macro virus scanning module is also in communication with the macro virus information module. The macro virus information module includes information that is used by the macro virus scanning module to detect both known and unknown viruses in macros. First, a decoded macro is scanned for known viruses. If a known virus is detected, then the decoded macro is flagged as infected. The decoded macro, the flag and information associating the decoded macro to the known virus that was detected in the decoded macro are stored in the data buffer. Thus, the infected macro and the file that the infected macro resides in can be properly treated and corrected by the macro treating module and the file correcting module.

If a known virus is not detected, then the macro virus scanning module determines whether the decoded macro includes an unknown virus. The macro virus scanning module detects unknown macro viruses using comparison data which is stored in the virus information module. The comparison data includes information that is used to detect combinations of suspect instructions in macros. An exemplary set of comparison data includes first and second suspect instruction identifiers. The macro virus scanning module determines that the macro includes a virus if it is determined that the macro includes both the first and second suspect instructions. If an unknown macro virus is detected, then the macro is flagged as infected according to the set of instruction identifiers that resulted in the positive unknown virus detection. As with the detection of a known virus, the information which resulted in the positive detection is stored in the data buffer along with the infected macro so that the macro treating module and the file correcting module can properly treat and correct the infected macro. Since combinations of suspect instructions in lieu of a particular sequential signature are sought, unknown viruses are detected by the macro virus scanning module. The information for detecting known and unknown viruses resides in a separate module and thus is easily updated.

The macro treating module is in communication with the macro virus scanning module and the data buffer and thereby accesses information about detected viruses. The macro treating module removes detected viruses from macros to provide a cleaned or sanitized macro so that the file which includes the infected macro can be repaired or otherwise corrected by the file treating module. The macro treating module accesses the decoded macro in the data buffer and determines whether it has been flagged as infected with a known virus. If the macro is flagged as infected by a known virus, then the known virus is removed from the macro. If the macro is not infected by a known virus, then the macro treating module treats the macro using the set of instruction identifiers that was used to detect an unknown virus in the macro. The macro treating module receives decoded macros and information regarding the presence of viruses from the macro virus scanning module and the data buffer. The suspect instructions within the decoded macro are identified and located using the instruction identifiers. The suspect instructions are then removed from the infected macro, preferably by replacement with benign instructions, to provide a treated macro which has been cleaned or sanitized. The treated macro is stored in the data buffer for access by the file correcting module. The integrity of the treated macro is verified and the validity of the treated macro is flagged accordingly. If macro integrity is maintained upon completion of macro treatment, then the validity flag is set. If integrity is not maintained, the flag is not set.

The file correcting module is in communication with the macro locating and decoding module, the macro virus scanning module, the macro treating module, the data buffer and the virus information module. Information about the treated macro and the targeted file that includes an infected macro are accessed in the data buffer. The file correcting module accesses the targeted file in its original form and stores a copy of the targeted file in the data buffer. The copy of the targeted file includes the infected macro. If the macro validity flag is not set, then the treated macro is not used to replace the infected macro and alternative corrective action is taken, such as deleting the targeted file, notifying the user about the presence of a file with an infected macro, or removing the infected macro from the targeted file and replacing the targeted file with the version without a macro. If the macro validity flag is set, then the file correcting module corrects the targeted file by replacing the infected macro with the treated macro. To replace the infected macro, the file correcting module locates and removes the infected macro from the targeted file so that a version of the targeted file without the macro is stored in the data buffer. The treated macro is then added to the version of the targeted file without the macro to provide a corrected file. The corrected file is used to replace the targeted file (in its original location). Thus, unknown viruses are removed from macros and the files which include such macros are corrected so that their legitimate functions are retained.

BRIEF DESCRIPTION OF THE DRAWINGS

These and other more detailed and specific features of the present invention are more fully disclosed in the following specification, reference being had to the accompanying drawings, in which:

FIG. 9 is a table including exemplary sets of comparison data used in the detection of macro viruses.

DETAILED DESCRIPTION OF THE INVENTION

Figure 1:
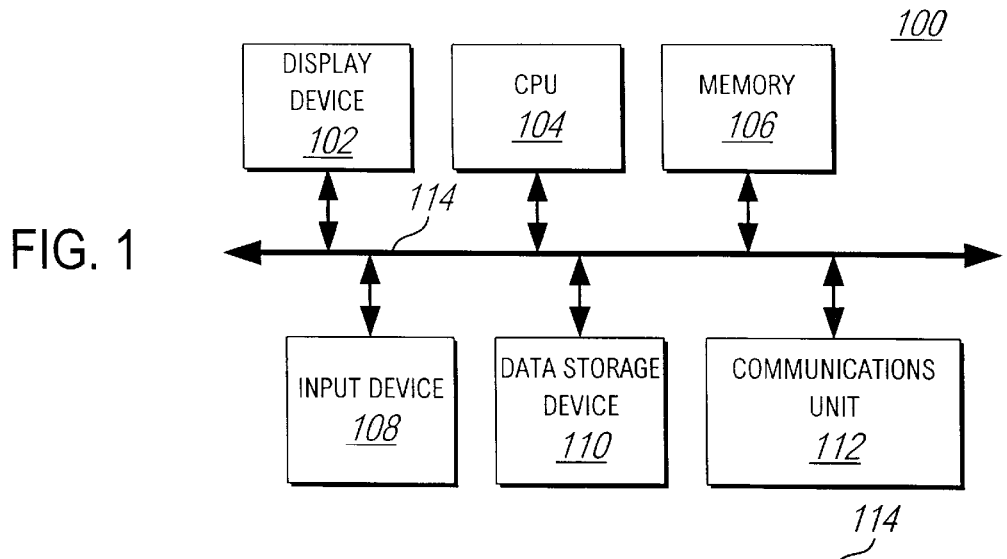
FIG. 1 is a block diagram illustrating a computer system including a macro virus detection apparatus in accordance with the present invention.

Referring now to FIG. 1, a computer system 100 constructed in accordance with an embodiment of the present invention comprises a central processing unit (CPU) 104, a display device 102, a memory 106, an input device 108, a data storage device 110, and a communications link 112. The CPU 104 is coupled by a bus 114 to the display device 102, memory 106, input device 108, data storage device 110 and communications unit 112 in a conventional architecture such as a von Nuemann architecture such as provided in a personal computer. The CPU 104 is preferably a microprocessor such as a Pentium as provided by Intel, Inc. of Santa Clara, Calif.; the display device 102 is preferably a video monitor; the memory 106 is preferably random access memory (RAM); the input device 108 preferably comprises a keyboard and mouse; the data storage device 110 is preferably a hard disk; and the communications unit 112 is a device, such as a modem, for facilitating communication with other systems.

It is understood that a variety of alternative computer system configurations are available and that the present invention is independent of their use. For example, alternative processors may be used for the CPU 104 such as those provided by Motorola, Inc., and the memory 106 may be read only memory (ROM) or a combination of RAM and ROM. Additionally, the system 100 may be connected to other computer systems such as through a network interface (not shown). It is also understood that the computer system 100 may be a minicomputer or mainframe computer.

The CPU 104, as directed by instructions received from the memory 106 as configured in accordance with the present invention, provides signals for accessing computer files, determining whether they include macros, locating the macros and scanning them to determine whether viruses including unknown viruses are present, and taking corrective action when such viruses are detected.

Figure 2:
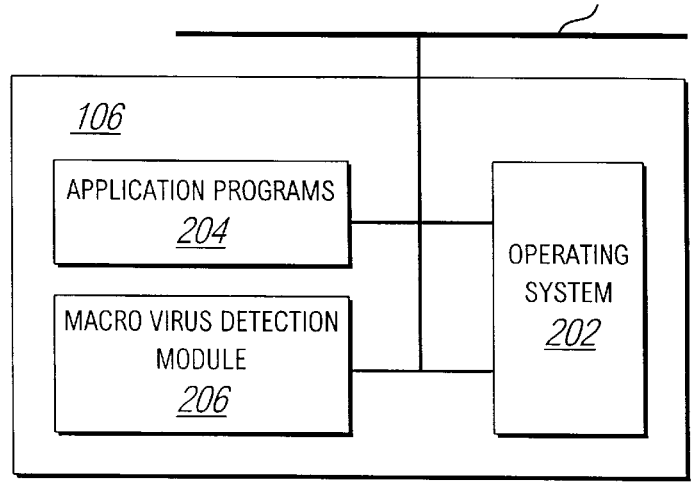
FIG. 2 is a block diagram illustrating a preferred embodiment of a memory in accordance with the present invention.

Referring now to FIG. 2, a preferred embodiment of the memory 106 as configured in accordance with the present invention is shown in more detail. The memory 106 includes an operating system 202, application programs 204 and a macro virus detection module 206.

The operating system 202 is preferably a conventional one for a personal computer such as WINDOWS 3.1 as provided by Microsoft, Inc. of Redmond, Wash. Any of the wide variety of application programs 204 may be included in the memory 106 such as word processing, spreadsheet and drawing programs. For example, the memory 106 may include Microsoft WORD as a word processing application and Microsoft EXCEL as a spreadsheet application. The application programs 204 typically create application data files. For example, WORD generates data files which typically use the file extension .DOC. Typical application programs 204 accommodate macros which allow sequential operations without necessitating repetitive user input. Conventional macros include various instructions including those for relatively simple operations such as keystrokes as well as those for operations such us opening, copying and deleting files. Sometimes, the macro instructions invoke the operating system (or DOS shell) to execute lower level commands like FORMAT. The instructions which may be used by macros are usually dictated by the application programs 204 which support macro programming languages. For example, macros for WORD files may be written using the WordBasic programming language.

Various operating systems 202 may be alternatively used in accordance with the present invention, such as OS/2 as provided by IBM, Inc. Also, various application programs 204 may be used. Although certain embodiments of the present invention describe the detection of macro viruses which use WordBasic commands in WORD application data files, the artisan will understand that the present invention applies to such alternative operating systems 202 and application programs 204.

The macro virus detection module 206 includes routines for the accessing files, determining whether such files include macros, scanning the macros to determine whether they contain viruses, treating macros which are found to contain viruses and correcting files with infected macros. The macro virus detection module 206 operates in conjunction with the operating system 202 and the application programs 204. The macro virus detection module 206 is typically implemented in software, but can also be implemented in hardware or firmware. Although the macro virus detection module 206 is preferably separate from the operating system 202 and application programs 204 as shown, the macro virus detection module 206 can alternatively be integrated into the operating system 202 or application programs 204 to perform similar functions of virus detection and correction.

Figure 3:
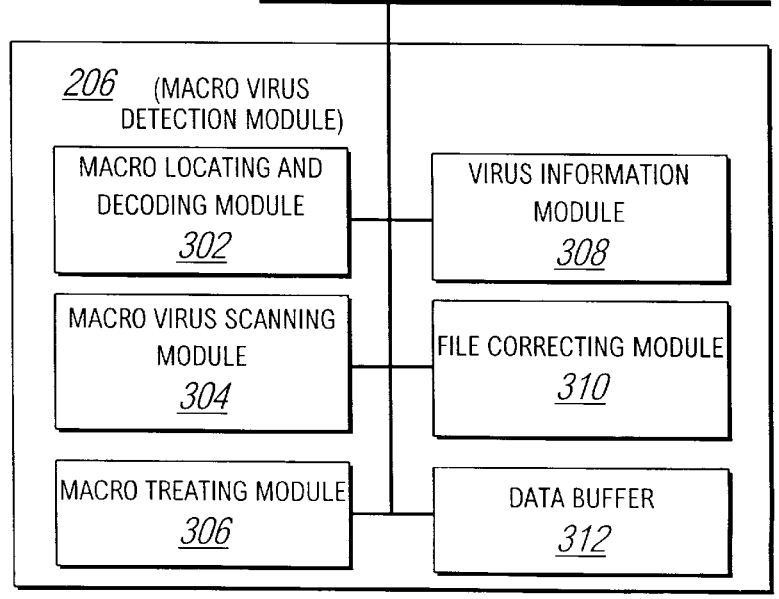
FIG. 3 is a block diagram illustrating a preferred embodiment of a macro virus detection module in accordance with the present invention.

Referring now to FIG. 3, a preferred embodiment of the macro virus detection module 206 includes a macro locating and decoding module 302, a macro virus scanning module 304, a macro treating module 306, and a file correcting module 310. Additionally, a virus information module 308 provides comparison data for the detection of viruses in macros and the treatment of macros with viruses, and the data buffer 312 provides for the storage of information which is used in the detection and correction of macro viruses. Although the data buffer 312 is shown as a single module which includes several separate storage locations, a plurality of separate data buffers may be used for the various described functions of the data buffer 312.

The macro virus detection module 206 accesses targeted files and determines whether they includes macros. Files are accessed dependent upon the configuration settings of the module 302 which are preset or determined by the user. For example, a system user may target a single file for analysis. Alternatively, groups of files may be targeted such as the files corresponding to a selected application program 204 or all files within selected directories or storage areas. Various events may initiate the analysis of files. For example, the user may initiate a virus scan, the analysis may be initiated any time certain application files are opened, or a complete analysis may be undertaken at every nth boot up of the system 100 or at periodic interval. Preferably, the macro locating and decoding module 302 is arranged to access any files which may contain a macro virus and to access such files prior to the launching of an application program 204 and accordingly prior to the opening of any application data files. This is advantageous because some macro viruses operate automatically upon a launching of the relevant application program and, accordingly, may require detection prior to user initiation of a scan.

Each targeted file is accessed and stored in the data buffer 312 for analysis by the macro virus detection module 206. While, for ease of understanding, the analysis of a single file is described in connection with certain functions of the various modules 302, 304, 306, 308, 310, 312 several files can be concurrently or sequentially analyzed in accordance with the present invention.

The macro locating and decoding module 302 examines targeted files to determine whether they are of a type that may include macros, examines targeted files to determine whether they include embedded macros, and locates and decodes macros within targeted files.

The macro locating and decoding module 302 is in communication with the data buffer 312 and thus accesses a targeted file for analysis. Macros are found in template files and embedded within application data files. The macro locating and decoding module 302 initially determines whether the targeted file is a template file. This determination is made by checking the file extension. For example, if the file is associated with the WORD application program 204, then the file is checked for the extension DOT. The DOT extension indicates that the file is a template file.

If the targeted file is not determined to be a template file, it may still include an embedded macro. For example, an application data file such as a WORD file with a .DOC extension may include an embedded macro. The macro locating and decoding module 302 accesses the targeted file stored in the data buffer 312, and determines whether its formatting indicates an embedded macro. The formatting fields vary according to the conventional rules of each application program 204 and are supplied by application program 204 manufacturers.

The macro is located within the targeted file once the determination is made that the targeted file includes a macro, whether it is embedded, provided in a template file or provided in another file type that can support macros. The macro locating and decoding module 302 is in communication with the operating system 202. The operating system includes information sharing resources such as Object Linking and Embedding (OLE, or OLE2) as provided in the Windows 3.1 operating system. The information sharing resources provide details regarding the structure of files such as application files, so that objects which are embedded may be located within the files. The information sharing resource commands vary dependent upon the operating system 202, but generally simple commands such as those for opening objects, seeking particular streams, and reading and writing to files are provided. Conventional programming techniques can be used to implement the information sharing resources in locating and decoding macros. After the macro is located, the macro locating and decoding module 302 decodes the macro so that it can be scanned for viruses. The information sharing resources of the operating system 202 are used to decode the macros into coherent information and ASCII conversion is used to convert the decoded macro into a form which is suitable for scanning. The decoded macro is stored in the data buffer 312. Additionally information associating the decoded macro to the targeted file from which it was derived are stored in the data buffer 312.

The macro virus scanning module 304 is in communication with the macro locating and decoding module 302 and the data buffer 312, and, accordingly, the macro locating and decoding module 302 provides the decoded macro to the macro scanning module 304. A preferred method of locating and decoding macros which is used by the macro locating and decoding module 302 is described in further detail with reference to FIG. 5.

The macro virus scanning module 304 includes routines for scanning the decoded macros to detect known and unknown viruses based upon comparison of the decoded macros to data from the virus information module 308. The macro virus scanning module 304 may be configured to provide various modes of macro virus detection. For example, it may be configured to detect only certain classes of viruses to facilitate shorter scanning periods; known, unknown, or both types of viruses may be detected; an alarm may be provided upon the first detection of a virus; or a scan of several targeted files may be completed prior to the indication that a virus has been detected.

The macro virus scanning module 304 accesses decoded macros in the data buffer 312, scans the decoded macros for known viruses and, where known viruses are not found, scans the decoded macros for unknown viruses. To scan for known viruses, the macro virus scanning module 304 uses signature scanning techniques. The virus scanning module 304 is in communication with the virus information module 308. The virus information module 308 includes information for detecting known viruses. For example, the virus information module includes strings of data, or signatures, for identifying known viruses. The virus scanning module 304 accesses a decoded macro in the data buffer 312 and scans the decoded macro to determine whether it includes any known virus signatures. A state machine or similar techniques can be used to conduct the scanning. If a known virus signature is found in the decoded macro, then the macro virus scanning module 304 identifies the decoded macro as infected according to the known virus and stores information associating the decoded macro to the known virus in the data buffer 312 so that other modules such as the macro treating module 306 can subsequently treat the infected macro accordingly.

If known viruses are not detected, the macro scanning module 304, scans for unknown viruses in the decoded macros. As indicated above, application programs 204 often include programming languages, such as WordBasic, which include instructions that are used by macros for various operations. Macro viruses use the various operations and instructions to perform undesired and often damaging actions.

Typical application programs 204 support macros by providing them in template files. Template files include stylistic and other settings such as word processing settings. Additionally, template files can include macros. Typically, a global template file provides the settings and macros for the data files. For example, for Microsoft WORD, the global settings and pool of macros reside in the template file NORMAL.DOT. When an application program 204 opens a data file, it usually opens the global template file first, loads the global settings and macros, and then opens the data file. Typical data files are formatted to indicate to the application program 204 that they do not include embedded macros. However, a data file can be formatted to indicate to the application program 204 that it does include a template file.

Certain macro viruses cause infected document files to be saved in template formats but maintain a document or data file extension (.DOC) to remain undetected. Thus, infected macros may be embedded within a document that appears to merely be an application data file. Some such macros include commands such as "AutoOpen", "AutoExec" or "AutoClose" which cause the macro to be executed when the data file is opened. Thus, a user can attempt to open what appears to be a regular data file but, in doing so, will be causing an embedded macro to execute automatically. Macro viruses also replicate themselves in other files. For example, a macro virus will often copy itself into a data file and format the data file to indicate a template format while maintaining a regular file extension for the data file. The file which is attacked by the macro virus may have its formatting changed directly, or, alternatively, the macro virus may save the attacked data file with the updated format information. The infected macros may also be copied into the global template and thereby spread to other files as they are opened.

The macro virus scanning module 304 includes routines to detect macro instruction combinations which are very likely to be used by macro viruses, or, in other words, combinations of suspect instructions. One combination of suspect instructions that is detected by the macro virus scanning module 304 is a macro enablement instruction and a macro reproduction instruction. A macro enablement instruction is one which allows the formatting of a file to be set to indicate that the file include a macro for execution. For example, the file formatting may be set to indicate a template file so that an application program 204 causes the template file to be executed when the file is opened. A macro reproduction instruction is one which allows the macro virus to be replicated. The combination of a macro enablement instruction and a macro reproduction instruction indicates a macro virus since such instructions allow replication and execution of a macro in a destination file, two common characteristics of macro viruses.

To identify suspect instruction combinations, the macro virus scanning module 304 accesses comparison data from the virus information module 308. The comparison data includes sets of instruction identifiers which are used to identify combinations of suspect instructions in the decoded macro. An exemplary set of instruction identifiers includes first and second suspect instruction identifiers. The instruction identifiers are binary strings and the decoded macros are scanned to determine whether they include the binary strings and, accordingly, the suspect instructions. If it is determined that the macro includes the combination of suspect instructions defined and identified by the set of instruction identifiers, then it is determined that the macro is infected by an unknown virus corresponding to that set of data. The macro virus scanning module 304 flags the decoded macro as infected with an unknown virus and stores information associating the decoded macro to the set of instruction identifiers that resulted in a positive unknown virus detection in the data buffer 312 so that other modules such as the macro treating module 306 can treat the infected macro accordingly. Combinations of suspect instructions which are detected by the macro virus scanning module 304, including those for macro virus enablement and macro virus reproduction, are described in further detail with reference to the flow chart of FIG. 6.

Preferably, the virus information module 308 is separate from the other modules 302, 304, 306, 310, 312 in the macro virus detection module 206. Thus, the information for the detection of macro viruses may be easily updated. For example, the virus information 308 may be updated by copying new information obtained from sources such as a floppy disk. Alternatively, the new information may be downloaded from internet resources which may be accessed through the communications unit 112 of the computer system 100, or through network links (not shown). The separate virus information module 308 facilitates more efficient information transfer, is easier to update and, thus, provides better protection of the system 100 from viruses, including those which are unknown.

The macro treating module 306 is in communication with the data buffer 312 and the macro virus scanning module 304 and accordingly receives information regarding the detection of viruses within the decoded macros from targeted files. The macro treating module 306 includes routines for checking the status of decoded macros to determine whether the macro virus scanning module 304 detected a known or unknown virus in the decoded macros, for removing macro viruses from the decoded macros and for verifying the integrity of treated macros.

The macro treating module 306 accesses a decoded macro in the data buffer 312 and checks the status of the decoded macro to determine whether the macro virus scanning module 304 detected a known virus. The status is provided by information in the data buffer 312 such as a status flag. Additionally, the data buffer 312 includes information associating the decoded macro to the known virus which infects it. As indicated, this information is provided from the macro virus scanning module 304. Alternatively, the macro virus scanning module 304 can store the appropriate information and communicate directly with the macro treating module 306. If the known virus determination flag is set, the macro treating module uses the information about the known virus to remove the known virus from the decoded macro. Preferably, known macro virus is selectively removed from the decoded macro and is replaced with benign instructions so that the remaining portions of the macro are retained for future use. The treated macro is separately stored in the data buffer 312 by the macro treating module 306. The integrity of the treated macro is then ascertained by the macro treating module and, where such integrity is maintained the treated macro is flagged as valid. If the integrity of the treated macro is not maintained, then the treated macro is flagged as invalid. The integrity of the macro can be checked by ascertaining whether the remaining instructions are intact and, additionally, by ascertaining whether the sequential linking of the instructions remains intact. Macro integrity verification allows other modules such as the file correcting module 310 to determine alternative remedies such as whether to replace an infected macro with a treated macro or to merely delete an infected macro from a targetted file.

If the macro virus scanning module 304 detected an unknown virus, then the macro treating module 306 treats the macro to remove the effects of the unknown virus. Similar to the known virus treatment protocol, the treating module 306 communicates with the data buffer 312 to determine whether an unknown virus was detected and, if so, to identify the instruction identifier set which resulted in a positive virus determination. Preferably, the set of suspect instruction identifiers that resulted in the detection of an unknown virus in the macro are used to correct the macro. Each instruction identifier is correlated to one or more suspect instructions so that such instructions may be identified and removed from the macro. The virus correction 306 locates and decodes the macro for correction or, alternatively, accesses macros which were previously decoded by the macro virus scanning module 304. Again, the suspect instructions are preferably removed from the decoded macro and replaced with benign instructions. The treated macro is stored in the data buffer 312 for access by other modules such as the file correcting module 310. Similar to the known virus treatment protocol, the integrity of the treated macro is verified and the macro is flagged accordingly. A preferred macro treating routine is described in more detail with reference to FIG. 7.

The file correcting module 310 is in communication with the data buffer 312 and other modules such as the macro treating module 306 and thereby receives information about the viruses which were detected in macros from targeted files. The file correcting module 310 includes routines for providing remedial action where infected files are indicated. The routines in the correcting module 306 may be configured to take various forms of remedial action automatically or only upon user authorization. For example, the file correcting module 310 may copy a targeted file with an infected macro, replace the infected macro with a treated macro, and then replace the targeted file with a corrected file without informing the user. The file correcting module 310 can also be configured to prompt the user at various correction stages whether the user wishes to proceed. This, of course, may be undertaken interactively using the input 108 and display devices 102 of the computer system 100. For example, the correcting module 310 may indicate to the user that a certain type of virus or unknown virus was detected in a macro from a targeted file. The user may then be asked whether he or she wishes to replace the targeted file with a corrected file. The artisan will recognize the various ways that the correcting module 306 may be configured and that the user may be prompted at various stages.

The file correcting module 310 communicates with the data buffer 312 which indicates targeted files that include infected macros. The file correcting module 310 accesses a targeted file that includes an infected macro and stores a copy of the targeted file in the data buffer 312 so that the file can be repaired. As described regarding the macro locating and decoding module 302, the macro virus scanning module 304, and the macro treating module 306 above, the data buffer 312 includes information about the targeted file such as an association of the targeted file to a treated macro, the validity of the treated macro, and information about the type of virus that was detected. The file correcting module 310 checks the macro validity flag in the data buffer 312 to determine whether the macro treating module 306 was able to remove the detected virus and maintain the integrity of the treated macro. If the integrity of the treated macro was maintained, then the file correcting module 310 repairs the targeted file in the data buffer 312 by replacing its infected macro with a treated macro. First, the viral macro is located within the infected file. This can be done by communication with the macro locating and decoding module 302 or may be independently done by the file correcting module 310, which like the locating and decoding module 302 can access the information sharing resources of the operating system 202 to locate the macro. After the macro is located within the infected targeted file, the macro is removed and a copy of the targeted file without the macro is stored in the data buffer 312. Then, the treated macro is added to the version of the targeted file that does not include the macro to provide a corrected file. The corrected file is used to replace the targeted file in its original location. This may be a direct replacement of the targeted file with the corrected file. Alternatively, the targeted file can be deleted or overwritten and the corrected file can be stored in a separate location.

Preferably a treated macro which corresponds to the targeted file which is flagged as invalid is not used to replace the infected macro. In such a situation, various alternative corrective actions may be taken by the file correcting module 310. For example, the user could be notified that the targeted file includes a virus, the infected macro could be removed from the infected macro without replacement, or the targeted file could be deleted.

Figure 4:
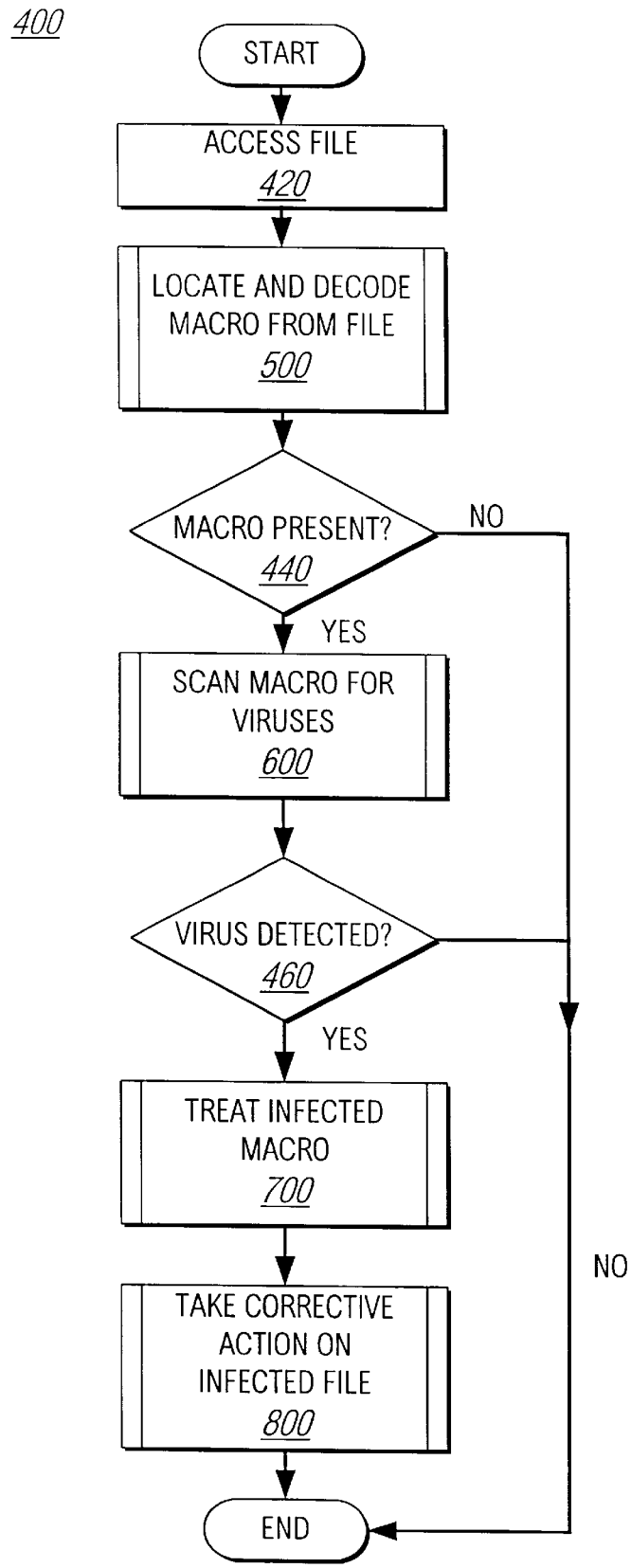
FIG. 4 is a flow chart illustrating a preferred method of detecting and correcting viruses in macros in accordance with the present invention.

Referring now to FIG. 4, a flow chart of a preferred method 400 of unknown virus detection in macros is shown. First, a file which is targeted for virus detection is accessed 420. Typically, targeted files will reside in memory 106 and such targeted files may be copied to the data buffer 312 so that the macro virus detection module 206 can detect and remove macro viruses from them. Although the processing of a single targeted file is described in detail, numerous files can be accessed and tested with the present invention. The timing and scope of file access depends upon how the macro virus detection module 206 is configured as explained in the description of the macro virus detection module 206 above. Specifically, various files may be targeted and the detection of viruses may be triggered based upon conditions which can be selected by the user. Preferably, though, the macro virus detection module 206 is configured to scan relevant application program 204 files including application data files without necessitating the launching of the application program 204 so that macro viruses which operate upon application program 204 launching can be detected and removed.

After accessing the targeted file and providing it in the data buffer 312, the macro locating and decoding module 302 determines whether any macros are in the targeted file and proceeds to locate and decode them. A preferred method 500 of locating and decoding a file is described in further detail with reference to FIG. 5. Next, it is determined 440 whether a macro was found by the locating and decoding module 302. If it is determined 440 that a macro is present in the targeted file, the macro is scanned 600 by the macro virus scanning module 304 to determine whether it is infected by a macro virus. If it is determined 440 that a macro is not present in the targeted file, then the method of macro virus detection ends. A preferred method of file scanning 600 is described in further detail with reference to FIG. 6. If a virus is detected 460 in the scan, then the infected macro is treated 700 by the macro treating module 306. If a virus is not detected 460 in the scan, then the method of virus detection ends. A preferred method of macro treating is described in further detail with reference to FIG. 7. After the macro is treated 700, corrective action 800 is taken on the infected targeted file after which the preferred method of macro virus detection ends. A preferred method of file correcting is described in further detail with reference to FIG. 8.

Figure 5:
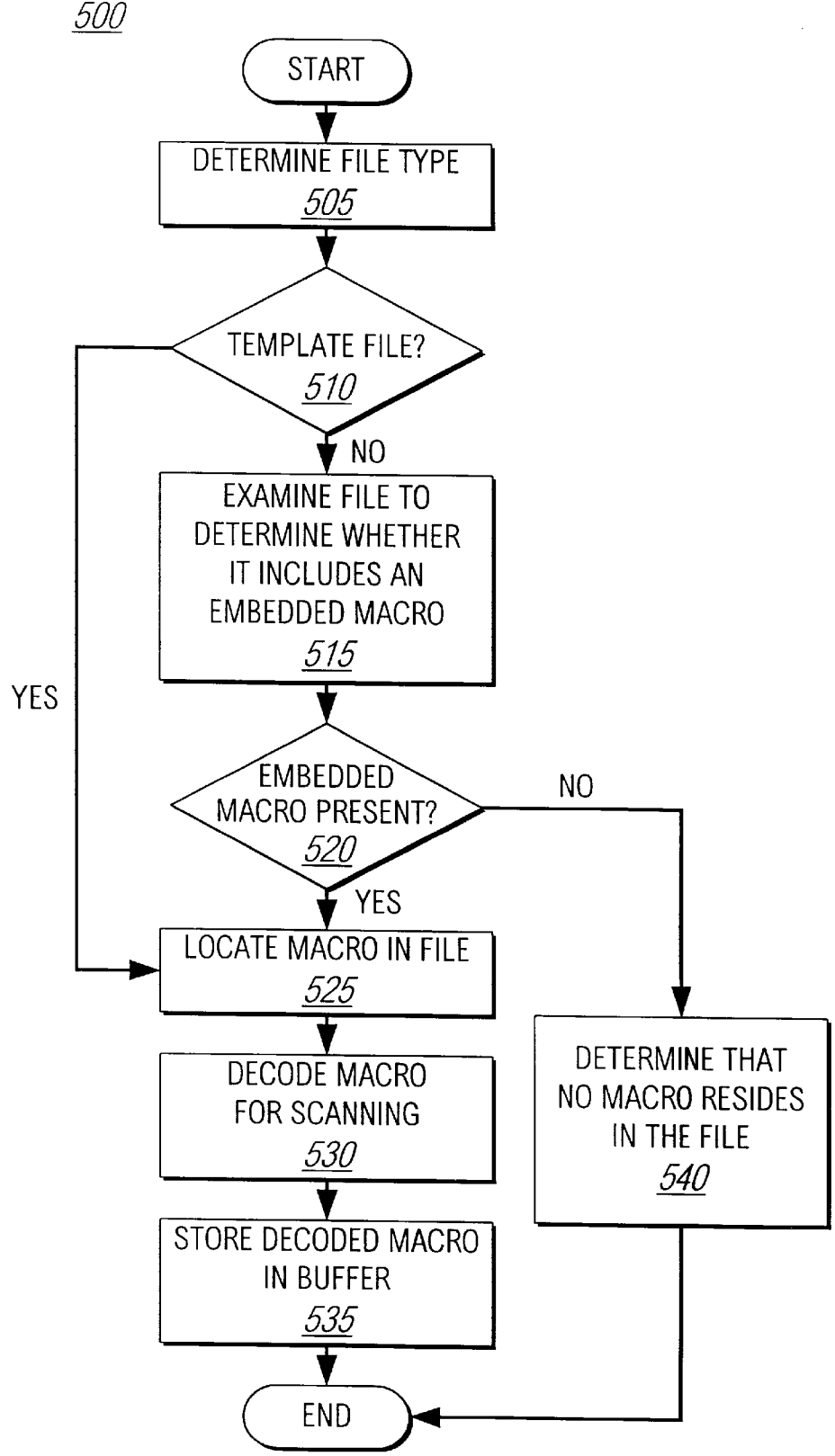
FIG. 5 is a flow chart illustrating a preferred method of locating and decoding macros in accordance with the present invention.

Referring now to FIG. 5, a flow chart of a preferred method 500 of macro locating and decoding in accordance with the present invention is shown. Various files may be targeted including application data files and template files. The macro locating and decoding module 302 includes routines which initially determine whether the targeted file includes a macro by determining in step 505 what type of file it is. This determination is made by checking the file extension of the targeted file. Through examination of the file type, it can be determined whether the targeted file is a template file. If the file is a template file, then the macro locating and decoding module 302 does not have to determine whether the targeted file includes an embedded macro. Thus, if it is determined in step 510 that the file is a template file, any macros within it are located 525 and decoded 530 so that they can be scanned for viruses by the macro virus scanning module 304. Any decoded macros are stored 535 in the data buffer 312 for access by the macro virus scanning module 304.

If it is determined in step 510 that the file is not a template file or other type of file that may include a macro, then in step 515 the targeted file is examined to determine whether it includes an embedded macro. If there are no embedded macros it is determined in step 540 that the targeted file does not include a macro and the preferred method ends. The determination of whether a file includes an embedded macro is performed by checking the file formatting. For example, one file format allows an application data file to indicate to an application program 204 that it includes a template file even where the file extension indicates otherwise. If the file format indicates a template file is included, then the targeted file may include an embedded macro. In step 520, if it is determined that the file does not include an embedded macro, then it is determined in step 540 that a macro does not reside in the targeted file and the preferred method 500 ends.

If it is determined in step 520 that the targeted file includes an embedded macro or in step 510 that the targeted file is a template file with a macro, the macro is located in step 525 and decoded in step 530. Preferably, the locating and decoding module 302 includes routines which use the operating system 202 information sharing resources such as Object Linking and Embedding (OLE, or OLE2) as provided in the Windows 3.1 operating system. As described regarding the locating and decoding module 302 above, the information sharing resources include instructions which provide details regarding the structure of files, such as application files and template files, so that objects which are integrated into files may be located and decoded. Conventional programming techniques can be used to implement the information sharing resources to locate and decode macros. After the macros are located and decoded, they are converted to binary code (e.g. by ASCII conversion) and in step 535 they are stored in the data buffer 312 so that can be scanned for viruses. In addition to storing the decoded macros, the macro locating and decoding module 302 maintains and stores an association between the decoded macro and the targeted file so that other modules such as the macro virus scanning module 304, the macro treating module 306 and the file correcting module 310 can properly scan, treat and correct targeted files. After the macros are decoded and stored in step 535, the preferred method 500 of locating and decoding ends.

Figure 6:
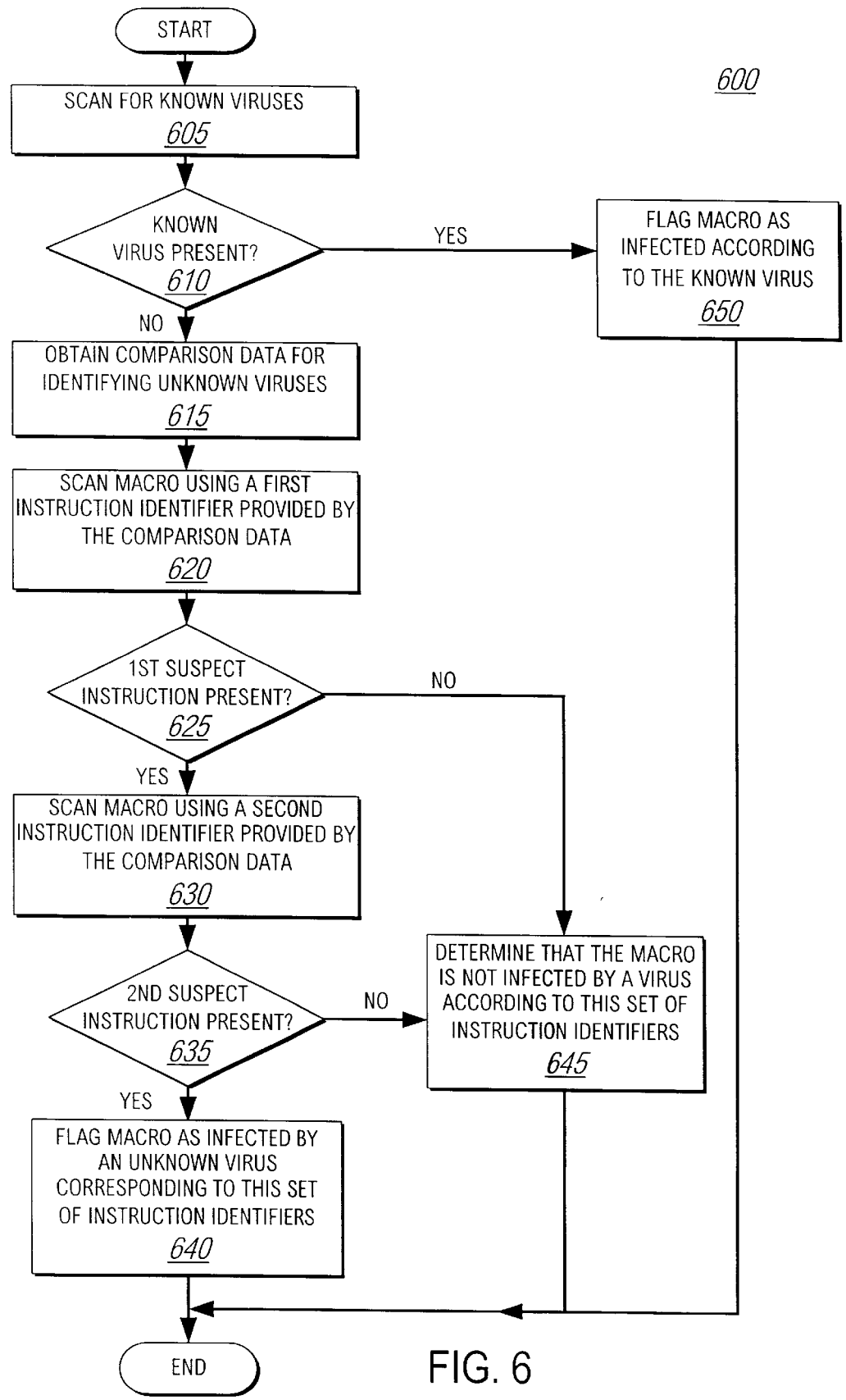
FIG. 6 is a flow chart illustrating a preferred method of scanning macros for viruses in accordance with the present invention.

Referring now to the flow chart of FIG. 6, a preferred method 600 for detecting viruses in macros in accordance with the present invention is shown. The macro virus scanning module 304 includes routines which access the decoded macro information provided by the locating and decoding module 302 and compare the decoded macro information to virus information 308 to detect the presence of a virus.

In a first step 605, the decoded macro is scanned for known viruses. To scan for known viruses, the macro virus scanning module 304 uses signature scanning techniques. The macro virus scanning module 304 accesses decoded macros in the data buffer 312 and determines whether they include known virus signatures that are provided by the virus information module. In step 610 it is determined whether the decoded macro includes a known virus based upon the known virus scanning step 605, and, if there are any known viruses present, in step 615 the macro virus scanning module flags the macro as infected according to the known virus and stores information associating the decoded macro to the known virus in the data buffer 312.

If in step 610 it is determined that known viruses were not detected in the scanning step 605, the macro virus scanning module 304 scans for unknown viruses in the decoded macros. In step 615, the macro virus scanning module 304 obtains a set of instruction identifiers for detecting unknown viruses. The macro scanning module 304 detects instructions which are likely to be used by macro viruses. These instructions are also referred to as suspect instructions. Certain combinations of suspect instructions are very likely to be used macro viruses. By looking for combinations of suspect instructions, false positive virus detection is avoided since a macro with two (or more) different suspect instructions is very likely to be infected.

As indicated in the description of the macro virus scanning module 304 above, typical application programs 204 provide macros in template files. Typically, application data files use a global template file but application data files can also be formatted to indicate that they include embedded macros. For example, WORD files can be saved in the .DOT format to indicate inclusion of a template file. Many macro viruses cause infected document files to be saved in template formats (.DOT) but maintain a document or data file extension (.DOC) to remain undetected. Thus, infected macros may be embedded within a document that appears to merely be an application data file. Macro viruses also replicate themselves in other files. For example, a macro virus will often copy itself into a data file and format the data file to indicate a template format while maintaining a regular file extension for the data file.

One combination of suspect instructions that is detected by the macro scanning module 304 is a macro enablement instruction and a macro reproduction instruction. A macro enablement instruction is one which formats a file to indicate that the file includes a macro for execution. For example, the file formatting may be set to indicate a template file so that an application program 204 causes the template file to be executed when the file is opened. A macro reproduction instruction is one which allows the macro virus to be replicated. The combination of a macro enablement instruction and a macro reproduction instruction indicates a macro virus since such instructions allow replication and execution of a macro in a destination file, two common characteristics of macro viruses.

In certain application files, such as Microsoft WORD files, if the file format field .format is set to 1, then the application program 204 (WORD) determines that the file may include embedded macros and, at appropriate initiation, will access and execute any macros which are embedded within the file. Thus, setting .format to 1 in a file enables execution of a macro in the file and any macro instruction that seeks to provide such a setting in a destination file may be construed as a macro enablement instruction. For example, the instruction if dlg.format=0 then dlg.format=1 is a macro enablement instruction since it allows the .format to be changed from 0 to 1 in a destination file. Other instructions, such as FileSaveAs a$, 1 keep an original file and save an additional copy of the file under a different format such as one that indicates that the file can include an embedded macro. Therefore, these types of instructions are also macro enablement instructions. Various alternative instructions which enable macro virus execution in files will be recognized.

A macro virus reproduction instruction is a type that allows replication of the macro virus. For example, the MacroCopy instruction copies a macro, and, if the macro is infected, all of its harmful instructions, from a source to a destination. Other instructions, such as Organizer .copy, also facilitate macro virus reproduction. It is understood that various alternative instructions can facilitate macro virus reproduction.

As indicated regarding the preferred method 500 of locating and decoding macros, the macro instructions from the targeted file are located and decoded into binary code for analysis. A unique binary code also corresponds to suspect instructions. For example, the macro virus enablement instruction if dlg.format=0 then dlg.format=1 has a particular corresponding binary code as does the macro virus reproduction instruction MacroCopy. Thus, the comparison data which is obtained 615 from the virus information module 308 may respectively include the binary code for the first and second instructions, or unique portions of the binary codes, to identify the first and second instructions in the macro from a targeted file.

Furthermore, in accordance with the present invention, it has been determined that unique binary code portions may correspond to several suspect instructions. For example, the binary string 73 CB 00 0C 6C 01 00 (in hexadecimal form) corresponds to the instruction portion .format=1 which is found in several macro virus enablement instructions. For example, the instruction if dlg.format=0 then dlg.format=1 noted above, as well as the instructions if bewaardlg.format=0 then bewarrdlg.format=1; FileSaveAs .Format=1; and FileSaveAs .Name=Filename$(), .Format=1 include the binary string 73 CB 00 0C 6C 01 00. Thus, a particular string such as 73 CB 00 0C 6C 01 00 is used by the present invention as an identifier for detecting a plurality of different suspect macro instructions.

The comparison data in the virus information module 308 preferably includes several sets of instruction identifiers. Various combinations of suspect instructions may be detected using the sets of instruction identifiers. Various different macro virus enablement and/or macro virus reproduction instructions may be identified using each set of instruction identifiers. The instruction identifiers are not restricted to macro virus enablement and reproduction instructions. For example, an instruction which causes the computer hard disk to be reformatted without verification and an instruction which changes the system settings to allow such reformatting without user notice could be used as a suspect instruction combination.

Referring now to FIG. 9, a data table including exemplary sets of instruction identifiers which are stored in the virus information module 308 is shown. The exemplary data table 900 includes rows 902 which correspond to several different sets of instruction identifiers. Columns identifying the sets of instruction identifiers 903, their instruction identifier numbers 904 and text and corresponding hexadecimal representations 905 of the binary code for the instruction identifiers are included. Preferably, two instruction identifiers are included in each set of instruction identifiers, but additional instruction identifiers can be included in a set. Additionally, a positive macro virus determination can be made based upon detection of two out of three instruction identifiers or some other subset of identifiers. The data table 900 is exemplary only. The comparison data may be variously stored in the virus information module 308.

Referring again to the flow chart of FIG. 6, once a set of instruction identifiers is obtained by the macro virus scanning module 304 in step 615, the decoded macro is scanned to determine whether it includes a combination of suspect instructions as identified by the instruction identifiers. In step 620, the decoded macro is scanned using a first instruction identifier. For example, the decoded macro may be scanned 620 to determine whether a string 73 CB 00 0C 6C 01 00 which corresponds to the first instruction identifier in the first set of exemplary instruction identifiers 900 is present. The scanning in step 620 may be undertaken by a state machine which scans the decoded macro and determines whether the string is present. In step 625, it is determined whether the first suspect instruction identifier is present in the decoded macro. If it is determined 625 that the no instruction corresponding to the first instruction identifier is present, then in step 645 it is determined that the macro is not infected according to the set of instruction identifiers and the method of macro virus scanning 600 ends.

Therefore a first set of suspect instruction identifiers as shown in FIG. 9 includes the strings 73 CB 00 0C 6C 01 100 and 67 C2 80. A second set of suspect instruction identifiers includes the strings 73 CB 00 0C 6C 01 00 and 64 6F 02 67 DE 00 73 87 02 12 73 7F. A third set of suspect instruction identifiers includes the strings 73 CB 00 0C 6C 01 00 and 6D 61 63 72 6F 73 76 08. A fourth set of suspect instruction identifiers includes the strings 12 6C 01 00 and 64 67 C2 80 6A 0F 47 and a fifth set of suspect instruction identifiers includes the strings 79 7C 66 6F 72 6D 61 74 20 63 6A and 80 05 6A 07 43 4F 4D.

If it is determined in step 625 that the first instruction identifier is present, then the decoded macro is scanned in step 630 to determine whether the second instruction identifier is present. If in step 635 it is determined that the macro includes the second suspect instruction identifier, then in step 640 the decoded macro is flagged as infected by an unknown virus corresponding to the set of instruction identifiers. Information associating the decoded macro to the set of instruction identifiers that resulted in a positive unknown virus detection is stored in the data buffer 312 so that other modules such as the macro treating module 306 can treat the infected macro accordingly.

If it is determined in step 635 that the second identifier is not present, the macro virus scanning module 304 determines in step 645 that, according to the set of instruction identifiers, an unknown virus is not present in the decoded macro and the preferred method 600 of macro virus scanning ends. The determination in step 635 is provided with regard to a single set of instruction identifiers. Other sets of instruction identifiers can be iteratively compared to the decoded macro to otherwise provide a positive determination of an unknown virus. Additionally, the presence of a common first instruction identifier can be determined prior to searching for various alternative second instruction identifiers.

Figure 7:
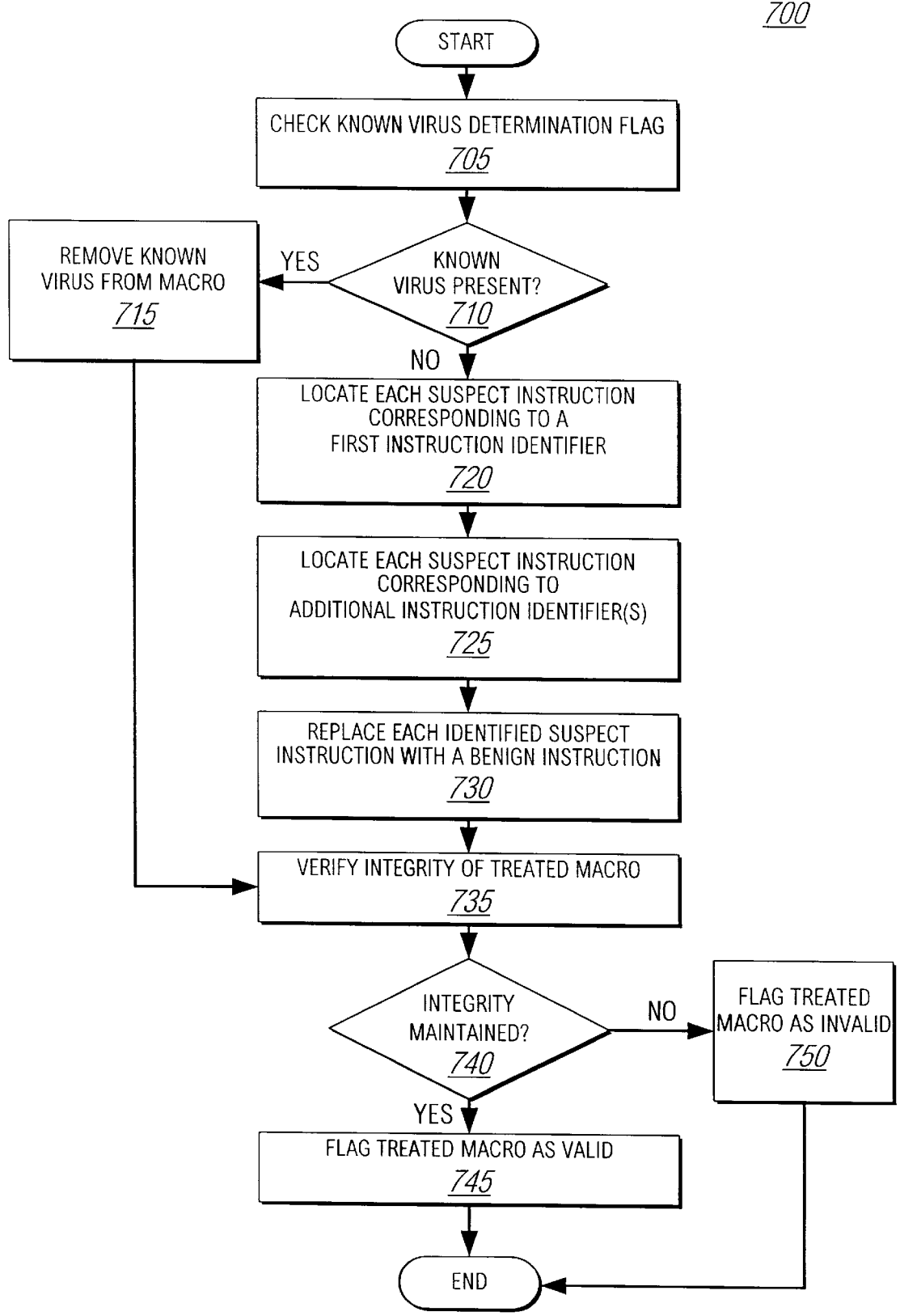
FIG. 7 is a flow chart illustrating a preferred method of treating macros in accordance with the present invention.

Referring now to the flow chart of FIG. 7 a preferred method 700 for treating infected macros is shown. In step 705, the known virus determination flag is checked to determine whether the macro virus scanning module 304 detected a known virus in the decoded macro. The known virus determination flag is provided to the macro treating module 306 in the data buffer 312, which also associates the decoded macro to the virus information used to detect the known virus. The virus information is used, in step 715, to remove the known virus from the decoded macro. Preferably, the virus is removed from the macro by replacing it with benign instructions (such as no-ops). Since the virus is known, it can be selectively removed such that the legitimate portions of the macro remain. After removal of the virus, in step 735 the treated macro is checked to verify its integrity. If it is determined that the integrity of the treated macro was maintained, then in step 745 the treated macro is flagged as valid by the macro treating module 306. The treated macro is or remains stored in the data buffer 312 as does the information regarding its validity. If it is determined in step 740 that integrity was not maintained, then the treated macro is flagged as invalid in step 750 and the information is similarly stored in the data buffer.

Referring back to step 710, if it is determined by the macro treating module 306 that a known virus is not present in the decoded macro, then the macro is treated to selectively remove an unknown virus. The set of instruction identifiers that was used to detect an unknown virus in the decoded macro is available to the macro treating module 306 in the data buffer 312. An exemplary set includes first and second suspect instruction identifiers. In step 720, the first suspect instruction identifier is used to locate each suspect instruction which corresponds to the identifier. The decoded macros can be scanned to locate such instructions using the techniques described in connection with detecting the instructions used by the macro virus scanning module 304. If the instruction identifiers correspond to fragments of instructions rather than whole instructions, then the macro treating module 306 correlates each detected fragment to a whole instruction. The correlation will depend upon the programming language used by the macro. Conventional techniques can be used for the correlation. In step 725, the additional suspect instruction identifiers are used to locate corresponding additional suspect instructions. The located suspect instructions are then replaced in step 730. Similar to the replacement of known virus strings, preferably the suspect instructions are replaced with benign instructions. The integrity of the macro is verified and the treated macro is flagged according to whether its integrity was maintained, after which the method 700 of treating macros ends.

Figure 8:
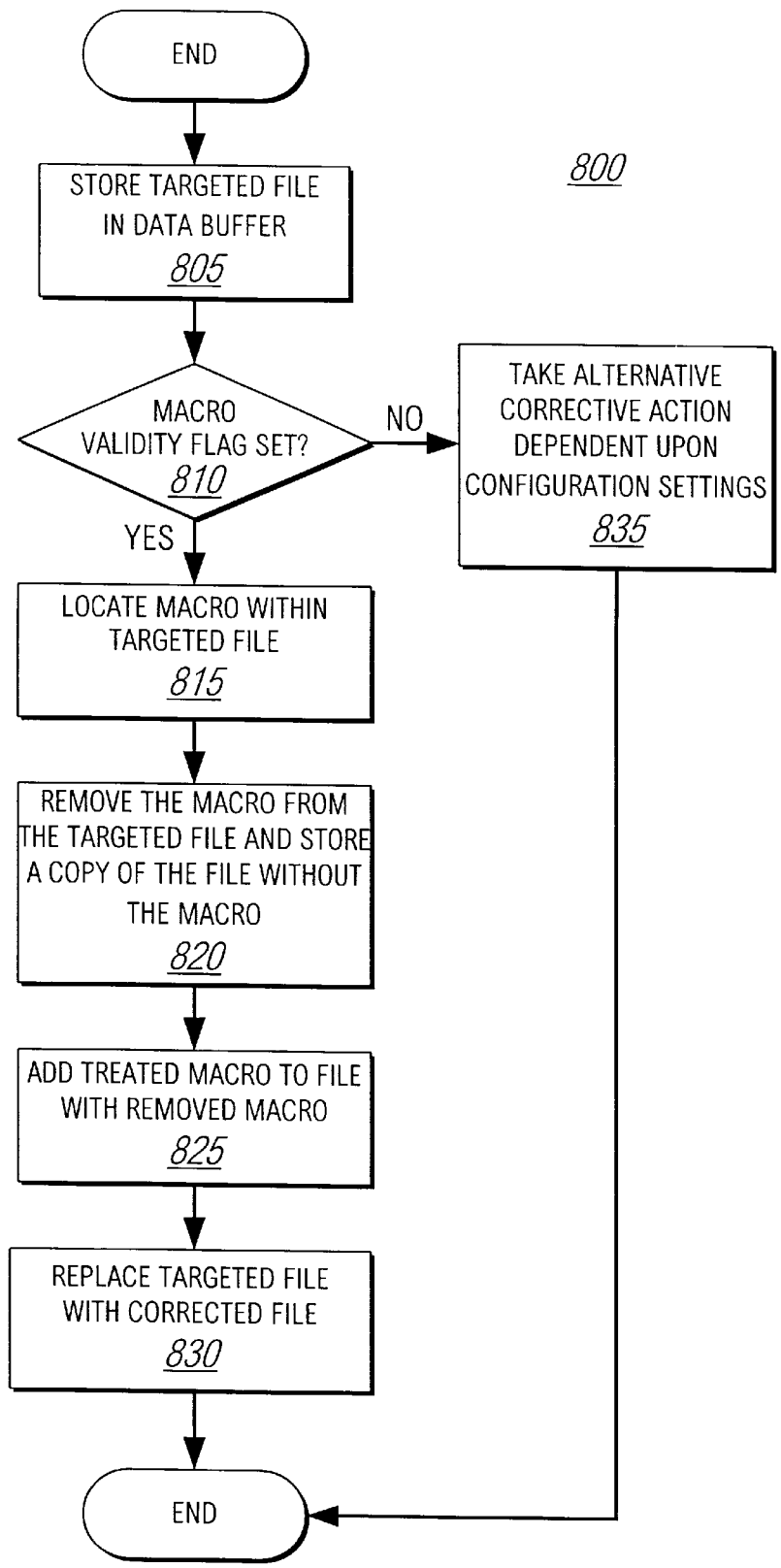
FIG. 8 is a flow chart illustrating a preferred method of correcting files in accordance with the present invention.

Referring now to the flow chart of FIG. 8, a preferred method 800 of file correcting in accordance with the present invention is shown. The file correcting module 310 is in communication with the data buffer 312 as well as the various modules 302, 304, 306, 308, 310 and thereby accesses information such as the macro viruses which were detected and the targeted files that the infected macros were found in. In step 805, a targeted file which includes a macro virus is stored in the data buffer 312. Preferably, the targeted file is accessed in its original location and is copied with its infected macro into the data buffer 312. The file correcting module 310 then takes corrective action by replacing the macro in the targeted file with a treated macro or by taking alternative corrective action. In step 810, the macro validity flag is checked to determine the integrity of the treated macro which corresponds to the targeted file. If the treated macro is indicated to be valid, then the file correcting module 310 replaces the infected macro in the targeted file with a treated macro. In step 810 the infected macro is located within the targeted file. This is done by using the information sharing resources (OLE) of the operating system 202. In step 820, the located macro is removed from the targeted file using the information sharing resources and a version of the targeted file without the macro is stored in the data buffer 312. In step 825, the treated macro which was produced by the macro treating module 306 is added to the version of the targeted file without the macro to provide a corrected file. In step 830, the corrected file is used to replace the targeted file in its original location. The corrected file can directly replace the originally targeted file. Alternatively, the targeted file can be deleted or overwritten and the corrected file stored elsewhere.

Referring back to step 810, if the treated macro which corresponds to the targeted file is flagged as invalid, the treated macro is preferably not used to replace the infected macro. Thus, in step 835, alternative corrective action is taken by the file correcting module dependent upon how it is configured by the user. Various alternative corrective steps will be recognized such as notifying the user that the targeted file includes a virus, removing the infected macro from the targeted file without replacement, or deleting the targeted file.

Although the present invention has been described with reference to certain preferred embodiments, those skilled in the art will recognize that various modifications may be provided. For example, although a sequence of accessing, locating, decoding, detecting and correcting has been described with respect to various modules, it is understood that the various processes may be integrated into common modules which perform equivalent functions in detecting an unknown virus in a macro. These and other variations upon and modifications to the described embodiments are provided for by the present invention which is limited only by the following claims.

We claim:

1. In a computer system comprising a processor and a memory, a method for detecting viruses in macros, the method comprising:

obtaining comparison data including information for detecting a virus;

retrieving a macro;

decoding the macro to produce a decoded macro; and scanning the decoded macro for a virus by comparing the decoded macro to the comparison data;

wherein the comparison data includes a first suspect instruction identifier and a second suspect instruction identifier;

wherein the scanning the decoded macro comprises:

determining whether the decoded macro includes a first portion which corresponds to the first suspect instruction identifier;

determining whether the decoded macro includes a second portion which corresponds to the second suspect instruction identifier;

determining that the decoded macro includes the virus if the decoded macro includes the first and second portions; and wherein the first suspect instruction identifier identifies a macro virus enablement instruction.

2. The method of claim 1, further comprising:

removing the virus from the macro to produce a treated macro if the scanning the decoded macro indicates that the macro is infected with the virus.

3. The method of claim 1, wherein the retrieving a macro comprises:

accessing a targeted file;

determining whether the targeted file is a template file;

if the targeted file is not a template file, determining whether the targeted file includes an embedded macro; and if the targeted file includes an embedded macro, locating the embedded macro.

4. The method of claim 1, wherein the second suspect instruction identifier detects a macro virus reproduction instruction.

5. The method of claim 1, wherein the removing the virus comprises:

locating a first suspect macro instruction in the decoded macro which corresponds to the first suspect instruction identifier; and removing the first suspect macro instruction.

6. The method of claim 5, wherein the removing the first suspect macro instruction includes replacing the first suspect instruction with a benign instruction.

7. The method of claim 5, wherein the removing the virus comprises:

locating a second suspect macro instruction in the decoded macro which corresponds to the second suspect instruction identifier; and removing the second suspect macro instruction from the decoded macro to produce a treated macro.

8. The method of claim 1, wherein the comparison data includes a plurality of sets of suspect instruction identifiers.

9. In a computer system comprising a processor and a memory, a method for detecting viruses in macros, the method comprising:

obtaining comparison data including information for detecting a virus;

retrieving a macro;

decoding the macro to produce a decoded macro;

scanning the decoded macro for a virus by comparing the decoded macro to the comparison data; and removing the virus from the macro to produce a treated macro if the step of scanning the decoded macro indicates that the macro is infected with the virus;

verifying the integrity of the treated macro; and replacing the infected macro in a targeted file with the treated macro dependent upon the integrity verification of the treated macro.

10. In a computer system comprising a processor and a memory, a method for detecting viruses in macros, the method comprising:

obtaining comparison data including information for detecting a virus;

retrieving a macro;

decoding the macro to produce a decoded macro;

scanning the decoded macro for a virus by comparing the decoded macro to the comparison data;

wherein the comparison data includes a first suspect instruction identifier and a second suspect instruction identifiers; and wherein a first set of respective first and second suspect instruction identifiers comprises the strings 73 CB 00 0C 6C 01 00 and 67 C2 80.

11. The method of claim 10, wherein a second set of respective first and second suspect instruction identifiers comprises the strings 73 CB 00 0C 6C 01 00 and 64 6F 02 67 DE 00 73 87 01 12 73 7F, a third set of respective first and second suspect instruction identifiers comprises the strings 73 CB 00 0C 6C 01 00 and 6D 61 63 72 6F 73 76 08, a fourth set of respective first and second suspect instruction identifiers comprises the strings 12 6C 01 00 and 64 67 C2 80 6A 0F 47, and a fifth set of respective first and second suspect instruction identifiers comprises the strings 79 7C 66 6F 72 6D 61 74 20 63 6A and 80 05 6A 07 43 4F 4D.

12. In a computer system comprising a processor and a memory, a method for detecting viruses in macros, the method comprising:

retrieving a macro;

obtaining comparison data for detecting a virus, the comparison data including a first suspect instruction identifier and a second suspect instruction identifier;

scanning the macro to determine whether the macro includes a first portion which corresponds to the first suspect instruction identifier;

scanning the macro to determine whether the macro includes a second portion which corresponds to the second suspect instruction identifier; and determining that the macro is infected with the virus if the macro includes the first and second portions;

wherein the first suspect instruction identifier includes the string 73 CB 00 0C 6C 01 00 and the second suspect instruction identifier includes the string 67 C2 80.

13. The method of claim 12, further comprising:

treating the macro to produce a treated macro if it is determined that the macro includes the first and second portions.

14. The method of claim 13, wherein the treating the macro comprises:

locating a first macro instruction in the infected macro which corresponds to the first suspect instruction identifier; and removing the first macro instruction from the infected macro to repair the infected macro.

15. The method of claim 14, wherein the treating the macro comprises:

locating a second macro instruction in the infected macro which corresponds to the second suspect instruction identifier; and removing the second macro instruction from the infected macro to repair the infected macro.

16. The method of claim 12, wherein the retrieving a macro comprises:

accessing a targeted file; and determining whether the targeted file is a template file;

if the file is not a template file, determining whether the targeted file includes an embedded macro; and if the file includes an embedded macro, locating the embedded macro.

17. The method of claim 12, wherein the comparison data includes a plurality of sets of suspect instruction identifiers.

18. In a computer system comprising a processor and a memory, a method for detecting viruses in macros, the method comprising:

retrieving a macro;

obtaining comparison data for detecting a virus, the comparison data including a first suspect instruction identifier and a second suspect instruction identifier;

scanning the macro to determine whether the macro includes a first portion which corresponds to the first suspect instruction identifier;

scanning the macro to determine whether the macro includes a second portion which corresponds to the second suspect instruction identifier;

determining that the macro is infected with the virus if the macro includes the first and second portions, wherein the comparison data includes a plurality of sets of respective first and second suspect instruction identifiers; and wherein a first set of suspect instruction identifiers comprises the strings 73 CB 00 0C 6C 01 00 and 67 C2 80, a second set of suspect instruction comprises the strings 73 CB 00 0C 6C 01 00 and 64 6F 02 67 DE 00 73 87 01 12 73 7F, a third set of suspect instruction identifiers comprises the strings 73 CB 00 0C 6C 01 00 and 6D 61 63 72 6F 73 76 08, a fourth set of suspect instruction identifiers comprises the strings 12 6C 01 00 and 64 67 C2 80 6A 0F 47, and a fifth set of suspect instruction identifiers comprises the strings 79 7C 66 6F 72 6D 61 74 20 63 6A and 80 05 6A 07 43 4F 4D.

19. In a computer system comprising a processor and a memory, a method for detecting viruses in macros, the method comprising:

retrieving a macro;

obtaining comparison data for detecting a virus, the comparison data including a first suspect instruction identifier and a second suspect instruction identifier;

scanning the macro to determine whether the macro includes a first portion which corresponds to the first suspect instruction identifier;

scanning the macro to determine whether the macro includes a second portion which corresponds to the second suspect instruction identifier;

determining that the macro is infected with the virus if the macro includes the first and second portions; and treating the macro to produce a treated macro if it is determined that the macro includes the firs and second portions, further comprising:

accessing a targeted file;

locating a macro within the targeted file;

removing the macro from the targeted file; and adding the treated macro to the targeted file to produce a corrected file.

20. An apparatus for detecting viruses in macros, the apparatus comprising:

a virus information module, for storing comparison data for detecting a virus, the comparison data including a first suspect instruction identifier and a second suspect instruction identifier;

a macro virus scanning module, in communication with the virus information module, for receiving the comparison data and scanning a macro to determine whether the macro includes a first portion which corresponds to the first suspect instruction identifier and a second portion which corresponds to the second suspect instruction identifier;

a macro locating and decoding module, in communication with the macro virus scanning module, for accessing a targeted file, determining whether the targeted file is a template file, determining whether the targeted file includes an embedded macro, and decoding the macro to produce a decoded macro;

a macro treating module, in communication with the virus information module, for accessing the decoded macro and removing a first macro instruction which corresponds to the first suspect instruction identifier and a second macro instruction which corresponds to the second suspect instruction identifier to produce a treated macro; and a file correcting module, in communication with the macro treating module, for accessing the targeted file, locating the macro within the targeted file, removing the macro from the targeted file and adding the treated macro to the targeted file to produce a corrected file.

21. The apparatus of claim 20, wherein the comparison data includes a plurality of sets of suspect instruction identifiers.

22. An apparatus for detecting viruses in macros, the apparatus comprising:

a virus information module, for storing comparison data for detecting a virus, the comparison data including a first suspect instruction identifier and a second suspect instruction identifier; and a macro virus scanning module, in communication with the virus information module, for receiving the comparison data and scanning a macro to determine whether the macro includes a first portion which corresponds to the first suspect instruction identifier and a second portion which corresponds to the second suspect instruction identifier, wherein the first instruction identifier includes the string 73 CB 00 0C 6C 01 00 and the second suspect instruction identifier includes the string 67 C2 80.

23. An apparatus for detecting viruses in macros, the apparatus comprising:

a virus information module, for storing comparison data for detecting a virus, the comparison data including a first suspect instruction identifier and a second suspect instruction identifier; and a macro virus scanning module, in communication with the virus information module, for receiving the comparison data and scanning a macro to determine whether the macro includes a first portion which corresponds to the first suspect instruction identifier and a second portion which corresponds to the second suspect instruction identifier;

wherein the comparison data includes a plurality of sets of respective first and second suspect instruction identifiers; and wherein a first set of suspect instruction identifiers comprises the strings 73 CB 00 0C 6C 01 00 and 67 C2 80, a second set of suspect instruction comprises the strings 73 CB 00 0C 6C 01 00 and 64 6F 02 67 DE 00 73 87 01 12 73 7F, a third set of suspect instruction identifiers comprises the strings 73 CB 00 0C 6C 01 00 and 6D 61 63 72 6F 73 76 08, a fourth set of suspect instruction identifiers comprises the strings 12 6C 01 00 and 64 67 C2 80 6A 0F 47, and a fifth set of suspect instruction identifiers comprises the strings 79 7C 66 6F 72 6D 61 74 20 63 6A and 80 05 6A 07 43 4F 4D.

24. An apparatus for detecting viruses in macros, the apparatus comprising:

means for obtaining comparison data for detecting a virus, the comparison data including a first suspect instruction identifier and a second suspect instruction identifier;

means for scanning the macro to determine whether a macro includes a first portion which corresponds to the first suspect instruction identifier;

means for scanning the macro to determine whether the macro includes a second portion which corresponds to the second suspect instruction identifier;

means for determining that the macro is infected with the virus if the macro includes the first and second portions;

means for accessing a targeted file and determining whether the targeted file includes a macro; and means for correcting a file, the means for correcting a file including means for accessing the targeted file, means for removing the macro from the targeted file and means for adding the treated macro to the targeted file to produce a corrected file.

25. The apparatus of claim 24, further comprising:

means for locating a first macro instruction and a second macro instruction within the macro which respectively correspond to the first suspect instruction identifier and the second suspect instruction identifier; and means for removing the first macro instruction and the second macro instruction from the macro to produce a treated macro.

* * * * *

(12) EX PARTE REEXAMINATION CERTIFICATE (7856th)
United States Patent
Chen et al.

(10) Number: US 5,951,698 C1
(45) Certificate Issued: Nov. 9, 2010

(54) SYSTEM, APPARATUS AND METHOD FOR THE DETECTION AND REMOVAL OF VIRUSES IN MACROS

(75) Inventors: Eva Y Chen, Cupertino, CA (US); Jonny T. Ro, Taipei (TW); Ming M. Deng, Taipei (TW); Leta M. Chi, Taipei (TW)

(73) Assignee: Trend Micro Incorporated, Shibuya-Ku, Tokyo (JP)

Reexamination Request:
No. 90/010,817, Jan. 11, 2010
No. 90/010,842, Jan. 29, 2010

Reexamination Certificate for:
Patent No.: 5,951,698
Issued: Sep. 14, 1999
Appl. No.: 08/724,949
Filed: Oct. 2, 1996

(51) Int. Cl.
*G06F 1/00* (2006.01)
*G06F 21/00* (2006.01)

(52) U.S. Cl. .................................................. 714/38
(58) Field of Classification Search .................. None
See application file for complete search history.

(56) References Cited

PUBLICATIONS

"Word Virus Hits U.S.: Trend Micro Devices Offers Free Detection Software Via the Internet World Wide Web", Trend Micro Press Release, distributed via Business Wire, Aug. 30, 1995 ("Trend Press Release").

"What a (Winword.)Concept", by Sarah Gordon, Virus Bulletin, Sep. 1995, pp. 8–9 ("Gordon").

"The Underground MS Word 6.x Macro Viruses FAQ V2.0 <Frequently Asked Questions>", by AuRoDrEpH, the Drow (pseudonym), The VBB Mag, Issue No. 2, Jun. 21, 1996, pp. 15–29 ("Macro Virus FAQ").

"Dynamic detection and classification of computer viruses using general behaviour patterns", by B. Le Charlier and M. Swimmer, Jul. 2, 1995 ("Charlier").

"Word 6.x Macro Viruses Frequently Asked Questions for the ALT.COMP.VIRUS Newsgroup—Version 1.0", by Richard John Martin, Jan. 26, 1996, published on alt.comp.virus internet newsgroup ("Martin").

"A Nuclear Concept: Another Hit for MS Word", by Vadim Bogdanov and Andrew Krukov, Virus Bulletin, Nov. 1995 ("Bogdanov").

"Document Macro Viruses, Yes, you can spread a virus with a data file", by Joel McNamara, Dec. 1994, VX Heavens ("McNamara").

*Primary Examiner*—Alexander J Kosowski

(57) ABSTRACT

The detection and removal of viruses from macros is disclosed. A macro virus detection module includes a macro locating and decoding module, a macro virus scanning module, a macro treating module, a file treating module, and a virus information module. The macro locating and decoding module determines whether a targeted file includes a macro, and, where a macro is found, locates and decodes it to produce a decoded macro. The macro virus scanning module accesses the decoded macro and scans it to determine whether it includes any viruses. Unknown macro viruses are detected by the macro virus scanning module by obtaining comparision data that includes sets of instruction identifiers from the virus information module and determining whether the decoded macro includes a combination of suspect instructions which correspond to instruction identifiers. The macro treating module locates suspect instructions in the decoded macro using the comparison data and removes the suspect instructions to produce a treated macro. The file correcting module accesses a targeted file with an infected macro and replaces the infected macro with the treated macro produced by the macro treating module.

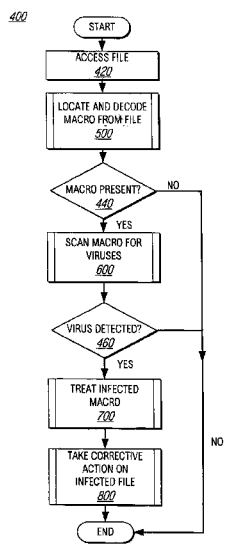

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 9-25 is confirmed.

Claims 1, 4, and 5 are determined to be patentable as amended.

Claims 2, 3, and 6-8, dependent on an amended claim, are determined to be patentable.

New claims 26-35 are added and determined to be patentable.

1. In a computer system comprising a processor and a memory, a method for detecting viruses in macros, the method comprising:
   obtaining comparison data including information for detecting a virus; retrieving a macro;
   decoding the macro to produce a decoded macro; and
   scanning the decoded macro for a virus by comparing the decoded macro to the comparison data *using the processor of the computer system*;
   wherein the comparison data includes a first suspect instruction identifier and a second suspect instruction identifier;
   wherein the scanning the decoded macro comprises:
   determining whether the decoded macro includes a first portion which [corresponds to] *includes* the first suspect instruction identifier;
   determining whether the decoded macro includes a second portion which [corresponds to] *includes* the second suspect instruction identifier;
   determining that the decoded macro includes the virus if the decoded macro includes the first and second portions; and
   wherein the first suspect instruction identifier [identifies] *includes a unique portion of* a macro virus enablement instruction.

4. The method of claim 1, wherein the second suspect instruction identifier [detects] *identifies* a macro virus reproduction instruction.

5. The method of claim 1, [wherein the removing the virus comprises:] *further comprising:*
   locating a first suspect macro instruction in the decoded macro which corresponds to the first suspect instruction identifier; and
   *removing the virus by* removing the first suspect macro instruction.

*26. The method of claim 1, wherein the macro virus enablement instruction is arranged to enable execution of any macro virus in a file.*

*27. The method of claim 1, wherein the macro virus enablement instruction is arranged to format a file to indicate that the file includes a macro for execution.*

*28. The method of claim 1, wherein the first suspect instruction identifier includes a unique portion of a plurality of different macro virus enablement instructions.*

*29. The method of claim 1, wherein the second suspect instruction identifier identifies an instruction likely to be used by a macro virus.*

*30. The method of claim 4, wherein the macro virus reproduction instruction is arranged to allow replication of a macro virus.*

*31. The method of claim 4, wherein the macro virus reproduction instruction is arranged to copy a target macro from a source to a destination.*

*32. The method of claim 1, further comprising:
   replacing the first portion which corresponds to the first suspect instruction identifier with a benign instruction.*

*33. The method of claim 1 wherein the virus is an unknown virus.*

*34. The method of claim 1, further comprising:
   providing an alarm when it is determined that the decoded macro includes the virus.*

*35. The method of claim 1, further comprising:
   flagging the decoded macro when it is determined that the decoded macro includes the virus.*

* * * * *